United States Patent Office 3,383,245
Patented May 14, 1968

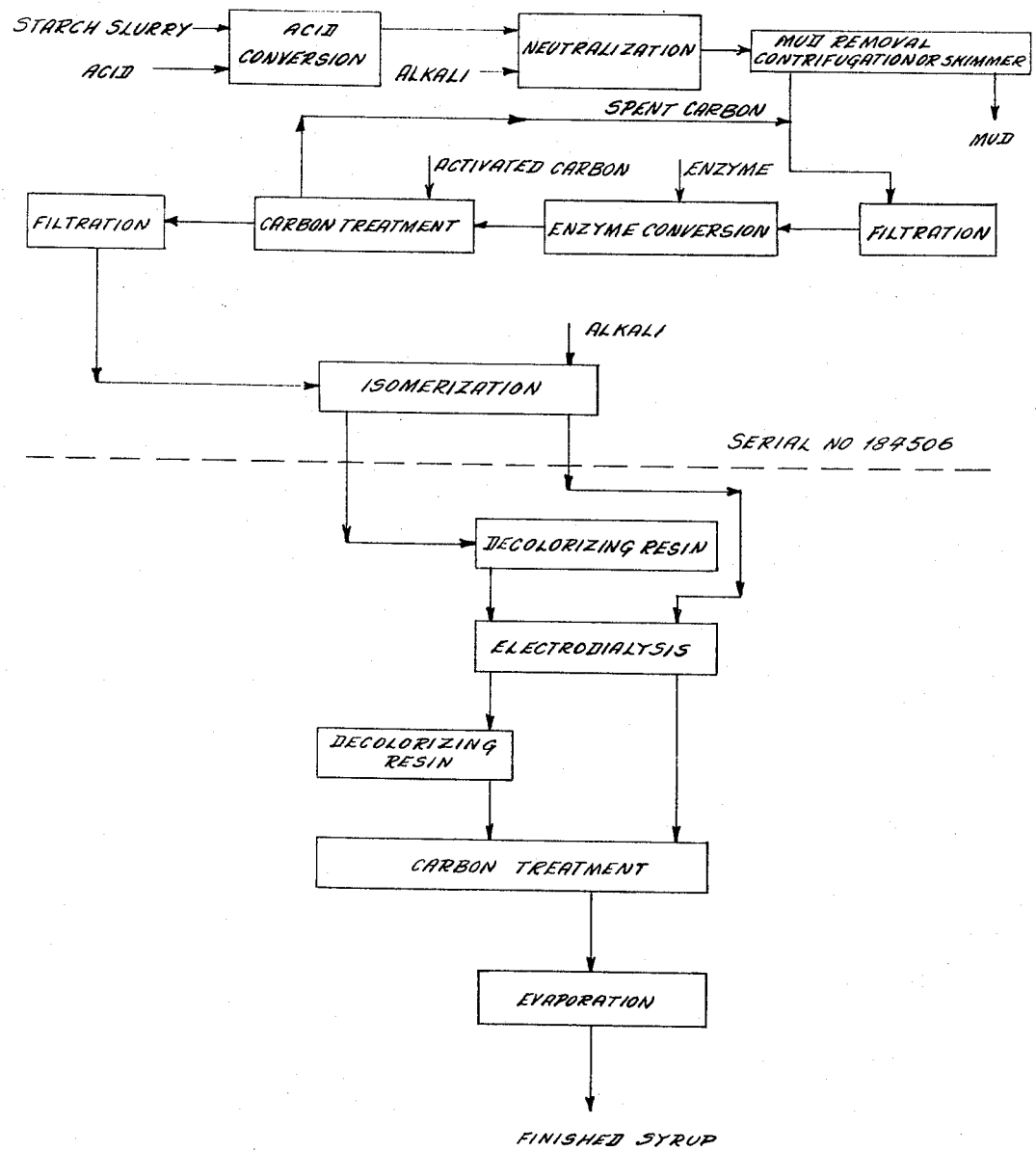

3,383,245
PROCESS OF PURIFYING HIGH D.E.-VERY SWEET SYRUPS
Barrett L. Scallet, Clayton, and Irving Ehrenthal, University City, Mo., assignors to Anheuser-Busch, Incorporated, St. Louis, Mo., a corporation of Missouri
Continuation-in-part of application Ser. No. 268,267, Mar. 27, 1963, now Patent No. 3,305,395, dated Feb. 21, 1967, which is a continuation-in-part of application Ser. No. 184,506, Apr. 2, 1962. This application Nov. 8, 1966, Ser. No. 592,797
5 Claims. (Cl. 127—53)

ABSTRACT OF THE DISCLOSURE

A process for purifying an isomerized corn type conversion syrup of above 70 D.E. in which ash is removed by electrodialysis, color is removed by an ion exchange resin in the chloride form and the syrup is treated with carbon.

This application is a continuation-in-part of our copending application S.N. 268,267, filed Mar. 27, 1963, now U.S. Patent 3,305,395, issued Feb. 21, 1967, which in turn is a continuation-in-part of our application S.N. 184,506, filed Apr. 2, 1962, now U.S. Patent 3,285,776, issued Nov. 15, 1966.

The present invention principally relates to process improvements concerning the purification of isomerized liquor.

Patent application Ser. No. 184,506 covers the making of a high D.E. syrup by means of hydrolysis of starch with mineral acids at high temperatures and under pressure and enzyme conversion of the hydrolysate to a 70–85 D.E. high glucose liquor. The high glucose-high D.E. liquor is then isomerized with alkali to produce a very sweet liquor of about 70–85 D.E., 10–23% fructose and a total of about 15–33% ketose sugars. The isomerized liquor having 40% solids generally also contains 0.5–1.0% ash (based on the total weight of the liquor) and a high level of color bodies and degradation products. Ion exclusion and ion exchange are then used to deash and decolorize the isomerized liquor to purify it for use as a commercial food product.

The purification of isomerized liquor is the greatest obstacle to commercial development of a high D.E. very sweet syrup from both an economic and technical standpoint.

The purification procedures of ion exclusion and ion exchange in application Ser. No. 184,506 results in yield losses higher than are economically practical under present circumstances. Also, under certain circumstances molecular exclusion occurs during ion exclusion causing some higher molecular weight sugars to be retained with the waste and thus increase the dextrose and fructose level of the effluent product. These yield losses of mainly high molecular weight sugars significantly add to the cost of producing a product.

Accordingly, the principal purpose of the present invention is to provide process improvements in the purification of the isomerized liquor of Ser. No. 184,506 whereby the yield losses are decreased and the overall process is made more economically practical.

These and other objects and advantages will become apparent hereinafter.

The figure shows a block flow diagram of the present process.

Briefly, the process improvements of the present invention involving purification of isomerized liquor are as follows:

(1) *Decolorizing Resin.*—Isomerized high D.E. liquor (0.5–1.0% ash on a 50% solids basis) is passed through a bed of strong base highly porous anion exchange decolorizing resin in the chloride form at a flow rate range of 0.5–5.0 gal./min. ft.$^2$ and a temperature range of 60–140° F. A number of strong base resins in the chloride form which have color absorbing properties are satisfactory for this purpose and includes:

(a) Rohm & Haas IRA 401–S which is a highly porous strong base gel type quaternary ammonium ion exchange resin.

(b) Rohm & Haas IRA 900 which is a highly porous strong base quaternary ammonium macroreticular ion exchange resin.

(c) Duolite ES 111 which is a highly porous strong base quaternary ammonium polystyrene matrix ion exchange resin, 16–50 mesh.

A preliminary decolorization is done at this stage to improve electrodialysis stack membrane life and stack efficiency in the next step of the process.

2. *Electrodialysis.*—Electrodialysis is a process which involves the transfer of ions from one solution through a membrane into another solution by imposing a direct electrical current. The dilution-concentration multimembrane cells used in this process consist of membranes each of which contains ion exchange groups and so gives each a positive or negative fixed electrical charge. Positive charged membranes (anionic membranes) will pass anions and repel cations. The negatively charged membranes (cation membranes) will pass cations and repel anions. The membranes are separated by spacers and placed so that no two like charged membranes are adjacent to each other in the cell pair dilution concentration system (i.e., membranes arranged anion, cation, anion, cation, etc.). The system basically consists of an electrode and electrode membrane at each end, and a stack of charged membranes, which are basically a series of oppositely charged cell pairs, each consisting of an anion membrane, a plastic spacer and a cation membrane.

The three streams in the process are the electrode stream (a recirculating dilute solution of $Na_2SO_4$), the diluting stream (the isomerized liquor stream to be deashed), and the concentrating stream (this is the stream to which the ash is transferred consisting of 0.05 N NaCl at the start of the run).

When a current is imposed between the two electrodes, positive ions (part of the ash) will pass from the diluting stream (the syrup liquor) through the cation membrane to the concentrating stream and further travel will be blocked by the anion membrane. Negative ions (part of the ash in the syrup) will pass from the diluting stream through an anion membrane into the concentrating stream where further lateral travel is blocked by a cation membrane. Ash removal is affected by type and number of membrane cell pairs, current density, temperature, flow rate, number of passes, etc.

The liquor effluent from the decolorizing column is then pumped into an electrodialysis stack assembly for removal of 50–95% of the ash content. Electrodialysis is conducted at a current density range $ie_0=4$ to 12, temperature range of 80–140° F. and a production rate range of 0.20–0.80 gal./hr. ft.$^2$ area using 61 CZL and 111 EZL Ionics, Inc. type membranes. These systems are described in Bulletin L–2 (Second Edition) ©1963 by Ionics Incorporated of Cambridge, Mass.

Product from the electrodialysis process has now had 50%–95% of the ash removed with no appreciable change in color or sugar distribution and a minimal yield loss.

3. *Decolorizing resin.*—The electrodialyzed liquor is now ready for further color removal and can be passed through a bed of decolorizing resin as per step No. 1. This procedure is an alternative treatment that can be used before carbon treatment to lower carbon consumption requirements.

4. Carbon treatment.—Liquor effluent directly from the electrodialysis or from the decolorizing treatment after electrodialysis (Step No. 3) is now treated as follows:
 (a) with activated powdered carbon and filtered;
 (b) or passed through a bed of granular carbon consisting of Pitt. Chem. CPG granular or equivalent and then filtered. Flow rate range is 0.1–5.0 bed volumes per hour at a temperature range of 70–140° F.

5. Concentration.—The carbon treated liquor is then concentrated to a range of 70–83% solids.

Detailed process specifications:

1. Resin decolorization.—Isomerized liquor is produced as per application Ser. No. 184,506. The isomerized liquor is first passed through a strong base quaternary ammonium decolorizing anion exchange resin in the chloride form. Preferred flow rate is 1 g.p.m./ft.$^3$ bed volume and a preferred temperature range of 90–120° F. Higher temperatures within allowable resin limits permit better resin decolorizing efficiency but also risk further degradation of isomerized liquor. Therefore, an upper limit in the 120° F. area is preferred. This decolorizing step is necessary to remove some of the organic degradation products and color bodies so as to improve electrodialysis stack efficiency and maximize stack membrane life in the next step of the subject process.

2. Electrodialysis.—The liquor from Step No. 1 is passed through an electrodialysis stack system to remove most of the ash present in the isomerized liquor. The desired final ash in the product is less than 0.5% and preferably less than 0.25% of a syrup which is about 80% solids. Assuming an intial ash of 0.75% on 40% solids, 83% of the ash must be removed to yield 0.25% ash at 80% solids and 67% of the ash must be removed to yield 0.5% ash in the final product. The level of ash can be controlled primarily by the number of passes made through the electrodialysis system at a given set of conditions. The preferred current density is $ie_0=4$ to 6 and the preferred temperature is 110°–140° F. Production rate for 90% ash removal of 0.91% ash from 40% solids liquor is 0.33 gal./hr. ft.$^2$ at 110° F. and $ie_0=4$ and 0.53 gal./hr. ft.$^2$ at $ie_0=4$ and $T=140°$ F. Yields are better than 97% and energy consumption for 90% ash removal of 0.91% ash from 40% solids feed liquor at $ie_0=4$ is 0.035 kwh./gal. liquor.

The electrodialysis step has deashed the liquor, removed traces of color and yields as effluent of essentially the same sugar composition as the feed.

3. Resin decolorizing.—The electrodialysis effluent liquor can now be passed through the same decolorizing process as in Step No. 1 to remove further color bodies and reduce carbon requirements. This step is optional and if omitted will only involve a higher carbon consumption requirement in the next step of the process.

4. Carbon treatment.—The liquor either from the second decolorizing step or direct from the electrodialysis process can be treated with activated carbon in one of the following two ways:
 (a) Activated powdered carbon-batch treatment. The liquor can be treated with powdered activated carbon and filtered to remove remaining color bodies.
 (b) Granular carbon column. A granular carbon column containing Pitt Chem. CPG 44 x 40 mesh or equivalent is used to decolorize liquor from steps 2 or 3. Liquor flow rate is preferably 0.5–2.0 bed volumes per hour at a temperature of 100–140° F. The effluent is then filtered.

5. Evaporation.—The carbon treated liquor is concentrated to a very sweet high fermentable non-crystallizing syrup.

Examples

The following examples all utilize an isomerized feed liquor with the following analysis:

| | |
|---|---|
| D.E. | 75.3 |
| Ketose | 24.6 |
| Dextrose | 44.3 |
| Fructose | 20.0 |
| Psicose | 5.0 |
| Solids | 41.8 |
| Ash | 0.91 |

Color, percent transmission:

| | |
|---|---|
| 450 m$\mu$ | None |
| 550 m$\mu$ | 6.0 |
| 620 m$\mu$ | 31.0 |

All colors measured in 6" x ¾" optically matched colorimeter tubes with a Bausch and Lomb Spectronic 20 Colorimeter. The flow diagram shows the process steps used in making the product used in the examples. Also the specification of Ser. No. 184,506 gives the details of making such a product.

Example I (A) A volume of 4000 cc. isomerized liquor having the foregoing specifications is passed through a 100 cc. bed volume of Rohm & Haas IRA 401-S in the chloride form at a rate of 1 gal./min. ft.$^3$ at ambient temperature.

(B) The liquor effluent from the resin is passed through an electrodialysis stack pack assembly at $ie_0=4$ at 110° F. The stack pack consists of 10 cell pairs of Ionics Inc. 61 CZL and 111 EZL 9" x 10" membranes with 0.040" spacers. The electrodes are platinum-tatalum and Hastelloy C. The electrode stream is 0.1 N Na$_2$SO$_4$ and the starting concentration (waste) stream is 0.05 N NaCl. Starting liquor resistivity is 220 ohm/cm. at 110° F. and final liquor resistivity is 3050 ohm-cm. at 110° F.

(C) The electrodialyzed liquor is passed through a 100 cc. bed of IRA 401-S as per step A.

(D) The liquor is then carbon treated as a final decolorizing step. An analysis of product properties at the end of each processing step is as follows:

TABLE I

| Processing Description | Solids, Percent | Ash, Percent | D.E., Percent | Ketose, Percent | Fructose, Percent | Psicose, Percent | Dextrose, Percent | Color, Percent Transmission | | |
|---|---|---|---|---|---|---|---|---|---|---|
| | | | | | | | | 450 m$\mu$ | 550 m$\mu$ | 620 m$\mu$ |
| Feed (isomerized liquor) | 41.8 | 0.91 | 75.3 | 24.6 | 20.0 | 5.0 | 44.3 | None | 6.0 | 31.0 |
| A. Resin Decolorizing | 41.0 | 0.87 | 75.2 | 24.8 | | | 44.4 | None | 57.0 | 83.0 |
| B. Electrodialysis | 41.3 | 0.095 | 77.4 | 26.6 | 19.4 | 3.9 | 45.3 | 3.0 | 30.0 | 46.0 |
| C. Resin Decolorizing | 38.9 | 0.098 | 77.6 | 27.4 | | | 45.6 | 33.5 | 87.0 | 93.0 |
| D. Carbon Treatment (2–2% carbon treatments) | 40.1 | | 78.2 | 27.7 | 20.6 | 3.7 | 46.5 | 79.5 | 93.0 | 95.0 |

Example II

The steps here are identical to Example I except that step C, the second resin decolorizing step, is omitted. Analysis for feed, steps A and B, are identical to those of Table I of Example I. The liquor, carbon treated (2—2% carbon treatments) right from the electrodialysis system has the following color levels:

Color, percent transmission:

| | |
|---|---|
| 450 m$\mu$ | 38.5 |
| 550 m$\mu$ | 79.0 |
| 620 m$\mu$ | 88.5 |

Sugar contents of final product are similar to step D, Table I, Example I.

Example III (A) Isomerized feed liquor is electrodialyzed in electrodialysis stack pack assembly consisting of 10 cell pairs of Ionics Inc. 61 DZL & 111 EZL 9" x 10" membranes with 0.040" spacers, at $ie_0=4$ and 110° F. Electrodes are platinum-tantalum and Hastelloy C and the electrode stream is a solution of 0.1 N $Na_2SO_4$. Starting concentration of the concentration (waste) stream is 0.05 N NaCl. Resistivity of liquor is 220 ohm-cm. at 110° F. at the start and the final resistivity of deashed liquor is 3000 ohm-cm. at 110° F.

(B) (1) The electrodialyzed liquor is carbon treated to yield an analysis similar to Table I–D and the following color level:

Color, percent transmission (2—2% carbon treatments):
450 m$\mu$ ---------------------------------- 12.0
550 m$\mu$ ---------------------------------- 49.0
620 m$\mu$ ---------------------------------- 65.0

(2) The electrodialyzed liquor is passed through a column of IRA 401-S at the same conditions of step A, Example I. The effluent from the resin column is then carbon treated.

Analysis at the end of the processing stages is as follows:

TABLE II

| Processing Description | Solids, Percent | Ash, Percent | D.E., Percent | Ketose, Percent | Fructose, Percent | Psicose, Percent | Dextrose, Percent | Percent Transmission | | |
|---|---|---|---|---|---|---|---|---|---|---|
| | | | | | | | | 450 m$\mu$ | 550 m$\mu$ | 620 m$\mu$ |
| Feed | 41.8 | 0.91 | 75.3 | 24.6 | 20.0 | 5.0 | 44.3 | None | 6.0 | 31.0 |
| A. Electrodialysis | 41.6 | 0.098 | 77.5 | 26.6 | | | 45.9 | None | 12.0 | 27.0 |
| (B) (1) Resin treatment | 39.4 | 0.099 | 78.0 | 26.0 | 20.1 | 4.1 | 46.1 | 20.0 | 81.5 | 90.0 |
| (2) 2—2% carbon treatment | 40.0 | | 79.3 | 27.0 | 20.1 | 4.1 | 46.3 | 73.0 | 90.0 | 93.0 |

Example IV

Isomerized feed liquor is electrodialyzed as per part A of Example III. The feed liquor (4000 cc.) is then passed through a 500 cc. bed (320 g.) of Pitt. Chem. CPG 14 x 40 mesh granular carbon at a rate of 4.2 cc./min. (.5 bed vol./hr.) at 110–115° F. The composite is collected with the following analysis:

TABLE III

| Processing Description | Solids, Percent | Ash, Percent | D.E., Percent | Ketose, Percent | Dextrose, Percent | Percent Transmission | | |
|---|---|---|---|---|---|---|---|---|
| | | | | | | 450 m$\mu$ | 550 m$\mu$ | 620 m$\mu$ |
| Feed | Same as Feed of Table I | | 77.5 | 26.6 | 45.9 | None | 6.0 | 31.0 |
| Electrodialyzed liquor | 41.6 | 0.098 | 77.5 | 26.6 | 45.9 | None | 12.0 | 27.0 |
| Granular carbon composite effluent | 39.3 | | 78.9 | 29.4 | 47.6 | 56.0 | 85.0 | 90.0 |

As can be seen from the foregoing examples, the dextrose level increases slightly during purification because of removal of traces of high molecular weight sugars by the electrodialysis membranes, the resins, and particularly the carbon. While it is preferred to hold the final dextrose content below about 45% to insure that the final product is non-crystallizing, syrups of slightly higher dextrose are useful if used in a short time, and the presence of the fructose in the final syrups has been noted to increase the solubility of the dextrose so that levels of dextrose higher than precisely 45% are better tolerated.

The decolorized product from all four examples is concentrated under vacuum to 80% solids to form a decolorized, deashed very sweet corn syrup.

Thus it is seen that the present invention achieves all of the objects and advantages sought therefor.

This invention is intended to cover all changes and modifications of the examples of the invention herein chosen for purposes of the disclosure, which do not constitute departures from the spirit and scope of the invention.

What is claimed is:

1. A process of purifying an isomerized corn type conversion syrup of above about 70 D.E. and at least about 15% ketose of which at least 10% is fructose, comprising the steps of passing the isomerized syrup through a decolorizing resin of the strong base, anion exchange type in chloride form with color absorbing properties; passing syrup from the resin through an electrodialysis chamber and removing ash from the syrup, said electrodialysis treatment including a dilution-concentration type unit of multi-membrane cells of alternate anion-cation type separated by a spacer, an electrode stream of $Na_2SO_4$ and a concentrating stream of 0.05 N NaCl, said treatment being at a current density of 4 to 12, a temperature of 80–140° and a rate of 0.2 to 0.8 gal./hr./ft.$^2$: passing the electrodialyzed syrup through a decolorizing resin of the strong base, anion exchange type in chloride form with color absorbing properties; treating the syrup with activated carbon; and recovering a decolorized corn convesion syrup of less than about 0.5% ash, a D.E. of above about 70 and containing about 15% ketose of which at least about 10% is fructose; and concentrating the syrup to about 70–83% solids.

2. A process of purifying an isomerized corn type conversion syrup of above about 70 D.E., and at least about 15% ketose of which at least about 10% is fructose, comprising the steps of passing said syrup through an electrodialysis chamber and removing ash from the syrup, said electrodialysis treatment being at a current density of 4 to 12, a temperature of 80–140° F. and a rate of 0.2 to 0.8 gal./hr. ft.$^2$, said electrodialysis treatment including a dilution-concentration type unit of multi-membrane cells of alternate anion-cation type separated by a spacer, an electrode stream of $Na_2SO_4$ and a concentrating stream of 0.05 N NaCl, treating the syrup with carbon and removing color from the syrup, and recovering a corn conversion syrup of less than about 0.5% ash, a D.E. of above about 70, and at least about 15/ ketose of which at least about 10% is fructose.

3. A process of purifying an isomerized corn type conversion syrup of about 70–85 D.E. and having about 10–23% fructose and a total of about 15–33% ketose sugars, comprising the steps of passing the syrup through an electro-dialysis chamber and removing ash from the syrup, passing the syrup through a decolorizing resin in the chloride form to remove color from the syrup, treating the syrup with carbon to remove color from the syrup, and recovering a corn conversion syrup of less than about 0.5% ash, a D.E. of about 70–85 and having about 10–23% fructose and a total of about 15–33% ketose sugars.

4. The process of claim 3 wherein the electrodialyzed syrup is passed through an activated carbon bed at 0.1–5 bed/volume 1 hr. and 70–140° F.

5. The process of claim 4 including the steps of filtering the syrup from the carbon treatment and concentrating the syrup from the said filter to 70–83% solids.

References Cited

UNITED STATES PATENTS

| | | | |
|---|---|---|---|
| 2,354,664 | 8/1944 | Cantor et al. | 127—36 |
| 2,487,121 | 11/1949 | Fetzer et al. | 127—36 |
| 2,688,572 | 9/1954 | Warshaw | 127—54 |
| 2,860,091 | 11/1958 | Rosenberg | 204—180 X |
| 2,892,737 | 6/1959 | Rohwer et al. | 127—40 |
| 3,276,908 | 10/1966 | Idaszak | 127—40 |

MORRIS O. WOLK, *Primary Examiner.*

A. LOUIS MONACELL, MICHAEL E. ROGERS,
*Examiners.*

D. G. CONLIN, *Assistant Examiner.*